(12) United States Patent
Yu

(10) Patent No.: US 6,343,836 B1
(45) Date of Patent: Feb. 5, 2002

(54) BICYCLE SADDLE HAVING AN IMPROVED SHOCK ABSORBER

(76) Inventor: Tsai-Yun Yu, No. 1-2, Lane 1147, Sec. 1, Chung San Rd., Ta Chia Chen, Taichung Hsien (TW)

( * ) Notice: Subject to any disclaimer, the term of this patent is extended or adjusted under 35 U.S.C. 154(b) by 0 days.

(21) Appl. No.: 09/503,500

(22) Filed: Feb. 14, 2000

(51) Int. Cl.$^7$ ................................................. B60N 2/38
(52) U.S. Cl. ................................ 297/195.1; 297/198
(58) Field of Search .......................... 297/195.1, 198, 297/196, 205, 206, 203, 208, 210, 211, 212, 197

(56) References Cited

U.S. PATENT DOCUMENTS

| | | | | |
|---|---|---|---|---|
| 2,169,105 A | * | 8/1939 | Linder et al. | 297/208 |
| 2,178,678 A | * | 11/1939 | Baumker | 297/210 |
| 2,225,316 A | * | 12/1940 | Messinger | 297/210 |
| 3,698,763 A | * | 10/1972 | Worley | 297/208 X |
| 3,884,525 A | * | 5/1975 | Messinger | 297/212 |
| 5,397,161 A | * | 3/1995 | Huang | 297/195.1 |
| 5,507,476 A | * | 4/1996 | Lin | 297/211 X |

* cited by examiner

Primary Examiner—Peter M. Cuomo
Assistant Examiner—Stephen Vu
(74) Attorney, Agent, or Firm—Browdy and Neimark

(57) ABSTRACT

A bicycle saddle comprises a main body, two deflection members, a pliable support, and a bracing frame. The main body has a front portion and a rear portion wider than the front portion. The deflection members are fastened pivotally at the top end thereof with two opposite sides of the underside of the rear portion of the main body such that the axial direction of the pivot is corresponding to the front-rear direction of the main body, and that the bottom end of each deflection member swivels. The pliable support is fastened pivotally at both ends thereof with the bottom ends of the deflection members such that the top of the pliable support and the underside of the main body form therebetween a cushioning space. When the pliable support is exerted on by an external force, the pliable support is deformed. The bracing frame is disposed under the main body and is formed of two support rods, with each being fastened at the front end thereof with the underside of the front portion of the main body and at the rear end thereof with the pliable support.

9 Claims, 4 Drawing Sheets

BICYCLE SADDLE HAVING AN IMPROVED SHOCK ABSORBER

FIELD OF THE INVENTION

The present invention relates generally to a bicycle saddle, and more particularly to a bicycle saddle having an improved shock absorber.

BACKGROUND OF THE INVENTION

The Taiwan Utility Patent No. 110190 discloses an advanced bicycle saddle which is characterized by a long frame mounted in the rear end of the underside of the bicycle saddle such that two ends of the frame are fastened with the left and the right sides of a plastic housing seat of the bicycle saddle, and that a cushioning space is formed between the top of the frame and the underside of the housing seat. The saddle is provided in the bottom side thereof with two support rods, which are fastened at the rear end thereof with the fixation seat of the frame. The cushioning space is intended to absorb the weight of a bicyclist and the shock, so as to mitigate the discomfort of the hips of the bicyclist. In view of both ends of the frame being fastened or made integrally with the housing seat of a rigid plastic material, the wall forming and defining the cushioning space is so rigid that the cushioning space is inflexible at best, and that the cushioning space is in fact ineffective in absorbing the shock.

SUMMARY OF THE INVENTION

The primary objective of the present invention is therefore to provide a bicycle saddle with a better means for absorbing the shock.

In keeping with the principle of the present invention, the foregoing objective of the present invention is attained by a bicycle saddle comprising a main body, two deflection members, a pliable support, and a bracing frame. The main body has a front portion and a rear portion wider than the front portion. The two deflection members are fastened pivotally at the top end thereof with two opposite sides of the underside of the rear portion of the main body such that the axial direction of the pivot is corresponding to the front-rear direction of the main body, and that the bottom end of each of the deflection members swivels. The pliable support has a predetermined rigidity and a predetermined pliability. The pliable support is fastened pivotally at both ends thereof with the bottom ends of the two deflection members such that the top of the pliable support and the underside of the main body form therebetween a cushioning space. The pliable support remains arcuate in the normal state. When the pliable support is exerted on by an external force, both ends of the pliable support displace outward to result in a temporary change in its curvature. The bracing frame is disposed in the bottom of the main body and is formed of two support rods opposite in location to each other such that the front end of each support rod is fastened with the underside of the front portion of the main body, and that the rear end of each support rod is fastened with the pliable support.

DETAILED DESCRIPTION OF THE INVENTION

Figure 1:
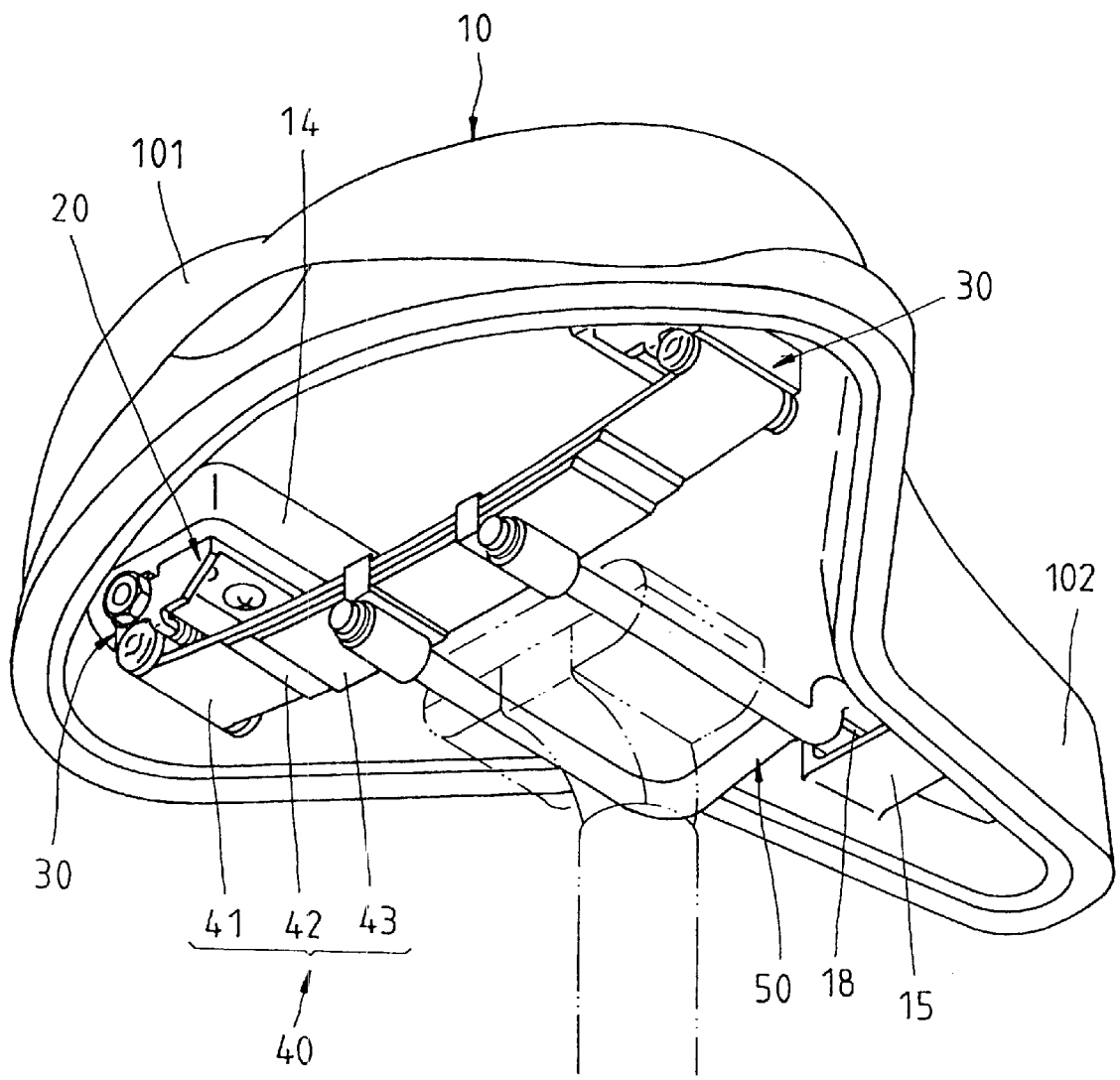
FIG. 1 shows a perspective view of a bicycle saddle of a preferred embodiment of the present invention which is mounted on the seat post of a bicycle frame.
Figure 2:
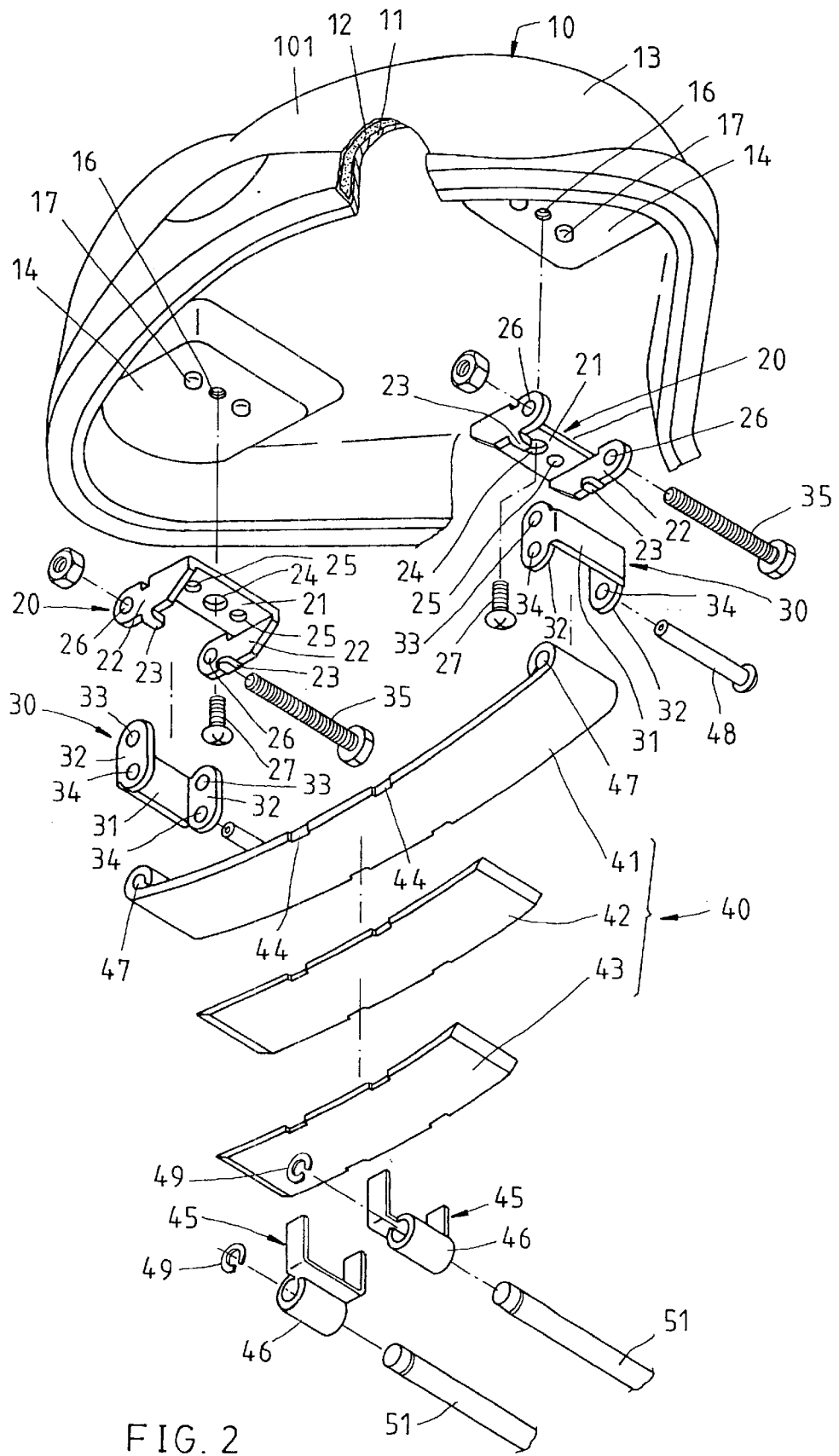
FIG. 2 shows an exploded view of the bicycle saddle of the preferred embodiment of the present invention.

As shown in FIGS. 1 and 2, a bicycle saddle embodied in the present invention comprises a main body 10, two bases 20 fastened with the underside of the main body 10, two deflection members 30 fastened pivotally with the two bases 20, a pliable support 40 bridging the two deflection members 30 and comprising three resilient pieces 41, 42 and 43 which are stacked together, and a bracing frame 50 mounted under the main body 10.

As shown in FIG. 2, the main body 10 is similar in construction to that of the conventional bicycle saddle and is formed of an inner case 11 of a rigid plastic material, a middle layer 12 of a foam material, and an upper layer 13 of leather. The main body 10 has a rear portion 101 and a front portion 102 narrower than the rear portion 101. The main body 10 is provided in the underside thereof (the underside of the plastic inner case 11) with two rear seat blocks 14 and a front seat block 15, which are made integrally. The rear seat blocks 14 are provided in the underside thereof with a threaded hole 16 and two locating knobs 17 between which the threaded hole 16 is located. The front seat block 15 is provided with an insertion slot 18 with an opening which faces rearward.

The two bases 20 are made of a metal plate by curving and are formed of a rectangular main plate 21 having at both ends thereof a side plate 22 extending uprightly therefrom. The side plate 22 is provided in the outer fringe thereof with a stop piece 23 extending uprightly therefrom. The main plate 21 is provided with a through hole 24 and two locating holes 25. Each side plate 22 is provided with a pivoting hole 26. The bases 20 are fastened with the underside of the main body 10 by a screw 27 which is engaged with the threaded hole 16 of the rear seat block 14 of the main body 10 via one side of the side plate 22 and the through hole 24. The locating knobs 17 of the rear seat block 14 are retained in the locating holes 25. The two side plates 22 are corresponding in location to the front and the rear of the main body 10 such that the pivoting holes 26 of the side plates 22 are located on the outer side.

Figure 4:
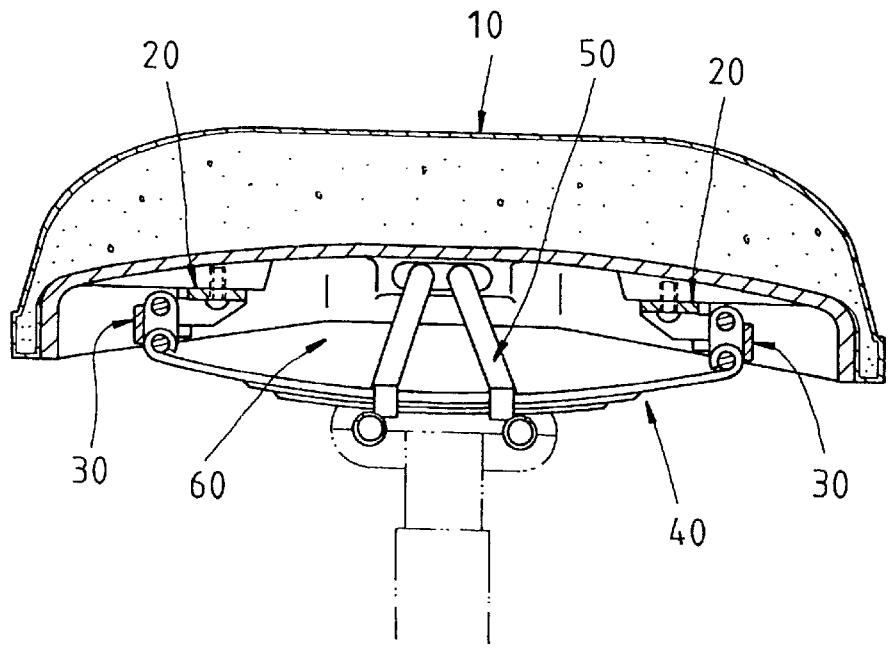
FIG. 4 shows a sectional view taken along the direction indicated by a line 4—4 as shown in FIG. 3.

The two deflection members 30 are made of a metal plate by bending and are formed of a rectangular main piece 31 smaller in length than the main plate 21 of the base 20. The main piece 31 is provided at both ends thereof with a side piece 32 extending vertically therefrom and having two axial holes 33 and 34. The deflection members 30 are fastened pivotally at the top end thereof by a pivot 35 which is received in the pivoting hole 26 and the upper axial hole 33 with the bases 20 such that bottom ends of the deflection members 30 swivel, and that the main pieces 31 are located on the outer side, and further that the two side pieces 32 are extended between the two side plates 22 of the bases 20. In view of the stop piece 23 of the base 20 being located at the inner side of the side piece 32, the swiveling bottom end of the deflection members 30 is stopped at the plumb position as shown in FIG. 4. In order to ensure the structural strength, the deflection members 30 are pivoted with the metal bases 20. Alternatively, the underside of the inner case of the main body made be provided with the side plates and the pivoting holes for pivoting the deflection members with the main body.

The pliable support 40 may be formed of two or more resilient pieces which are made of a steel plate of a rigidity and a pliability. The resilient pieces have a width smaller than the distance between the two side pieces 32 of the deflection members 30. The uppermost resilient piece 4 has a greatest length, with the middle resilient piece 42 having an intermediate length and with the bottommost resilient piece 43 having a smallest length. The resilient pieces are stacked together such that their centers are aligned. The resilient pieces are provided in the long side thereof with two sets of recesses 44 which are horizontally corresponding with each other and are vertically aligned with each other. The recesses 44 are engaged with two fastening clamps 45 of a metal frame construction having continuous curves, so as to hold the resilient pieces together securely. Each fastening clamp 45 is provided in the bottom thereof with a locating tube 46 extending in a front-rear direction. The resilient piece 41 is provided at both ends thereof with a tubular portion 47 winding upwardly and inwardly. The two tubular portions 47 are corresponding in location to the lower axial holes 34 of the two deflection members 30. The both ends of the resilient piece 41 are pivoted with the bottom ends of the deflection members 30 by two shaft rods 48 (rivets) which are received in the lower axial holes 34 and the tubular portions 46. The resilient pieces of the pliable support 40 in the normal state are arcuate as shown in FIG. 4. In the meantime, the deflection members 30 are in the plumb position.

Figure 3:
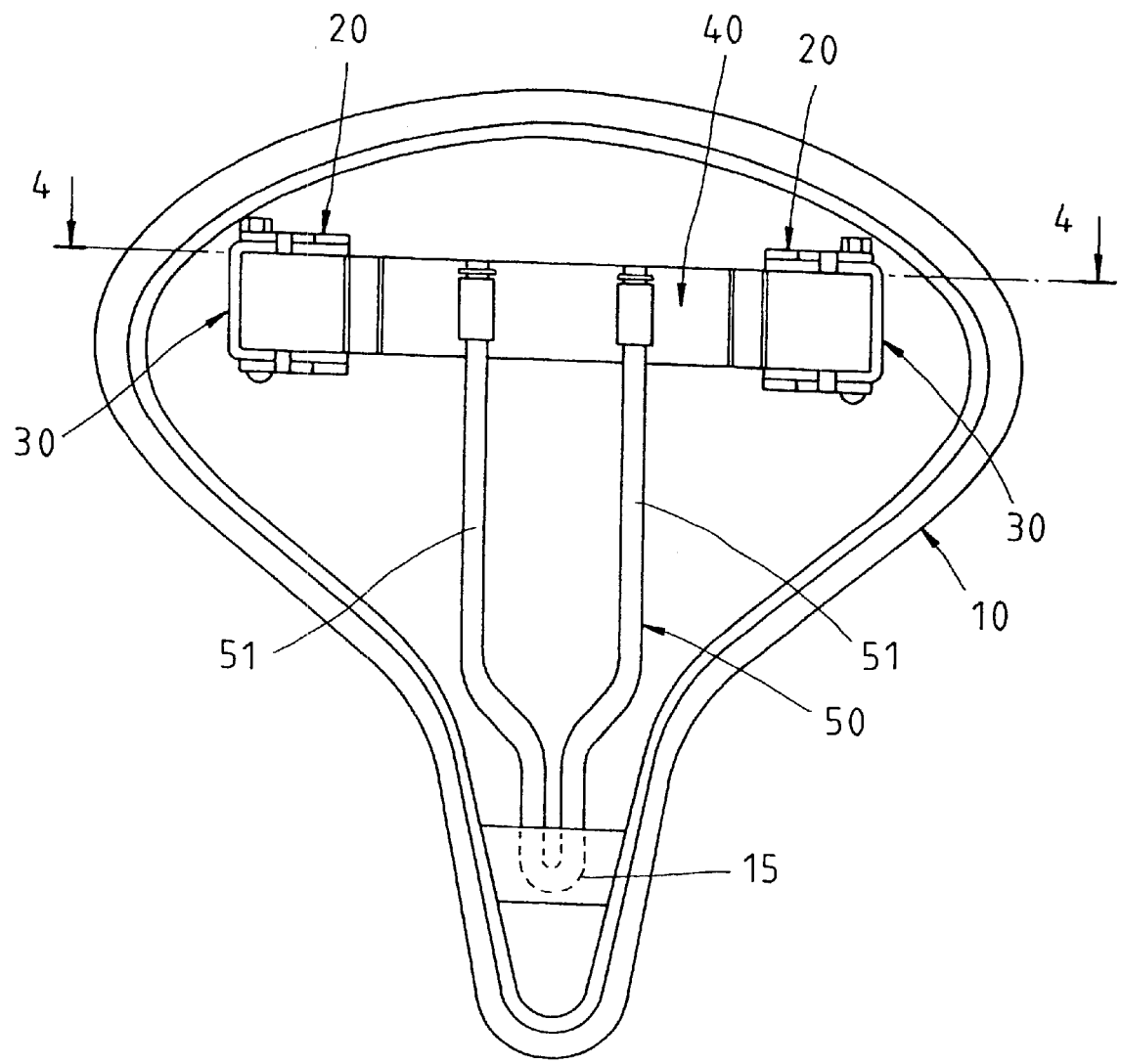
FIG. 3 shows a bottom view of the bicycle saddle of the preferred embodiment of the present invention in combination.

The bracing frame 50 is made of a metal round rod by bending. As shown in FIG. 3, the bracing frame 50 is symmetrical in construction and is fixed with the main body 10 such that the center of the loop of the bracing frame 50 is held in the insertion slot 18 of the front seat block 15, and that the two support rods 51 are jutted out of the locating tubes 46 of the pliable support 40 and located by a C-shaped retaining ring 49 for preventing the axial movement of the support rods 51. The locating tubes may be provided with a blind hole in place of the through hole. The support rods 51 may be fastened with the pliable support 40 by soldering.

As shown in FIG. 2, the present invention is mounted on a seat post 7 by a fastening seat 6 which holds securely the two support rods 51 of the bracing frame 50.

Figure 5:
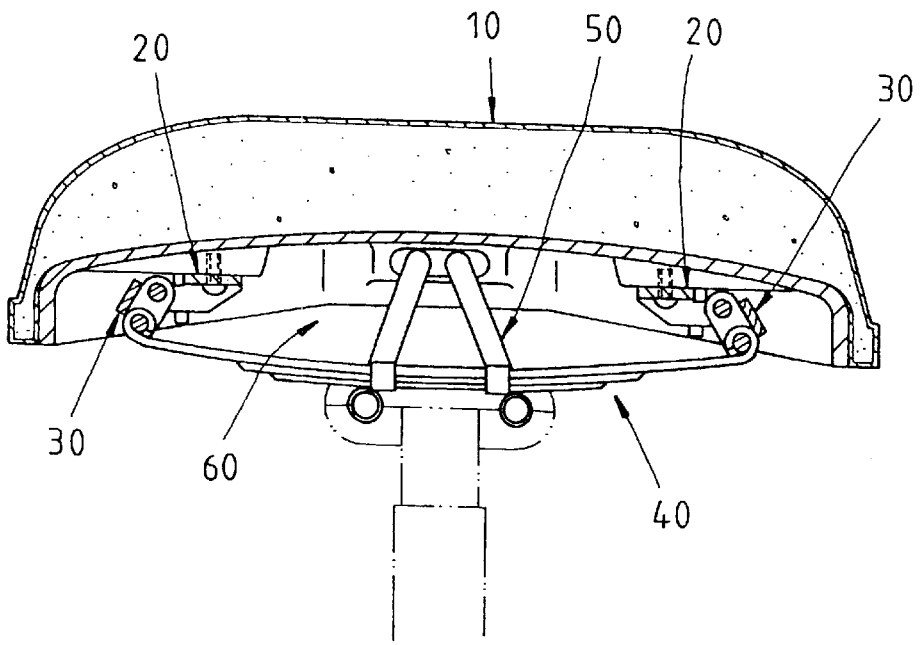
FIG. 5 shows a sectional view similar to FIG. 4 for illustrating the action of the preferred embodiment of the present invention being exerted on by an external force.

As illustrated in FIGS. 4 and 5, when the bicycle saddle of the present invention is not exerted on by an external force, the pliable support 40 remains in an arcuate shape of a predetermined curvature such that the top of the pliable support 40 and the underside of the main body 10 form therebetween a cushioning space 60 of an oval shape, as shown in FIG. 4. When the bicycle is in operation, the bicycle saddle of the present invention is exerted on by the pressure of a bicyclist's body weight. In the meantime, the pliable support 40 serves to bear the burden of absorbing the force of the bicyclist's body weight via the main body 10 and the bracing frame 50 as well as the vibrational force transmitted from the bicycle wheels in motion to the bracing frame 50. In view of the pliable support 40 being pivoted at both ends thereof with the two deflection members 30, the downward application force exerting on the two ends of the pliable support 40 and the upward application force exerting on the center of the pliable support 40 cause the resilient pieces of the pliable support 40 to deform such that the resilient pieces become almost flat, as shown in FIG. 5. As a result, the cushioning space 60 located between the main body 10 and the pliable support 40 is relatively more effective in mitigating the shock, as compared with the prior art cushioning space.

What is claimed is:

1. A bicycle saddle comprising:

a main body having a front portion and a rear portion wider than the front portion;

two deflection members pivoted at a top end thereof with an underside of said rear portion of said main body by a pivot which has an axial direction corresponding to a front-rear direction of said main body, whereby said deflection members have a bottom end capable of swiveling;

a pliable support having a rigidity and a pliability, said pliable support pivoted at both ends thereof with said bottom ends of said two deflection members such that a top of said pliable support and an underside of said main body form therebetween a cushioning space, wherein said pliable support is formed of at least two resilient pieces stacked on each other each having an accurate cross-section along a longitudinal length thereof at such time when said main body is not exerted on by an external force, wherein said arcuate cross-section is deformed at the time when said main body is exerted on by an external force; and a bracing frame disposed under said main body and formed of two support rods whereby said two support rods are fastened at a front end thereof with said front portion of said main body, and at a rear end thereof with said pliable support.

2. The bicycle saddle as defined in claim 1, wherein said pliable support is formed of three resilient pieces stacked together.

3. The bicycle saddle as defined in claim 2, wherein said three resilient pieces are different in length from one another such that the topmost resilient piece is greater in length than the middle resilient piece and the bottommost resilient piece, and that the middle resilient piece is greater in length than said bottommost resilient piece; wherein said resilient pieces are stacked together such that each of the centers of said resilient pieces is aligned to each other.

4. The bicycle saddle as defined in claim 3, wherein said deflection members are made of a metal plate by bending and are formed of a main piece which is provided on two opposite sides thereof with a side piece extending vertically therefrom such that said side piece is corresponding to said front-rear direction of said main body, and that said side piece is pivoted with the underside of said main body whereby said side piece is provided a t a bottom end thereof with a lower axial hole; wherein said topmost resilient piece of said pliable support is provided at both ends thereof with a tubular portion corresponding in location to said lower axial hole, said topmost resilient piece being pivoted with said deflection member by a pivot which is received in said axial hole and said tubular portion.

5. The bicycle saddle as defined in claim 4, wherein said main body is provided on the underside thereof with a base corresponding in location to a portion whereby said portion is pivoted with said deflection member, said base being made of a metal plate by bending and provided with a main plate fastened with the underside of said main body and provided at both ends thereof with a side plate extending therefrom and having a pivoting hole; wherein said two side pieces of said deflection members are provided at a top end thereof with two upper axial holes opposite to each other whereby said side pieces are pivoted with said base by a pivot received in said upper axial hole and said pivoting hole of said base.

6. The bicycle saddle as defined in claim 5, wherein said side plate of said base is provided on an outer fringe thereof with a stop piece pressing against an inner edge of said side piece of said deflection members, so as to avert the bottom end of said deflection member to swivel inward.

7. The bicycle saddle as defined in claim 2, wherein said resilient pieces of said pliable support are held securely together by at least two fastening clamps.

8. The bicycle saddle as defined in claim 7, wherein said resilient pieces are provided on a long side thereof with a retaining recess; wherein said fastening clamps are retained in said recess of said resilient pieces.

9. The bicycle saddle as defined in claim 7, wherein said two fastening clamps are arranged symmetrically on said pliable support whereby said fastening clamps are provided with a locating tube; wherein said two support rods of said bracing frame are received in said two locating tubes such that one end of said support rods is jutted out of said locating tube and is located by a C-shaped ring.

* * * * *